United States Patent [19]

Schmid

[11] Patent Number: 4,586,596
[45] Date of Patent: May 6, 1986

[54] CLUTCH PLATE WITH A COMPOSITE TORSION DAMPING HUB

[75] Inventor: Christoph Schmid, Wooster, Ohio

[73] Assignee: Luk Lamellen und Kupplungsbau GmbH, Bühl/Baden, Fed. Rep. of Germany

[21] Appl. No.: 478,111

[22] Filed: Mar. 23, 1983

[51] Int. Cl.[4] .............................................. F16D 3/14
[52] U.S. Cl. ............................... 192/106.2; 192/70.17
[58] Field of Search ............... 192/106.1, 106.2, 70.16, 192/70.17, 70.18, 70.13

[56] References Cited

U.S. PATENT DOCUMENTS

| | | | |
|---|---|---|---|
| 2,861,664 | 11/1958 | Simon et al. | 192/70.13 |
| 3,938,635 | 2/1976 | Davies et al. | 192/106.2 |
| 4,044,873 | 8/1977 | Parsons | 192/106.2 |
| 4,177,888 | 12/1979 | Arrowsmith | 192/106.2 |
| 4,270,645 | 6/1981 | Beccaris | 192/106.2 |
| 4,301,907 | 11/1981 | Carpenter et al. | 192/106.2 |
| 4,433,771 | 2/1984 | Caray | 192/106.2 |
| 4,485,908 | 12/1984 | Gatewood | 192/106.2 |

*Primary Examiner*—George H. Krizmanich
*Attorney, Agent, or Firm*—Peter K. Kontler

[57] ABSTRACT

A clutch plate wherein the hub is assembled of two coaxial sleeve-like sections the inner of which has external teeth mating, with limited angular play, with internal teeth of the outer section. The two sections are held against axial movement with reference to one another by stops which are provided on the inner section and flank the outer section. A friction generating device is interposed between at least one of the stops and the respective end face of the outer section to oppose angular movements of the two sections relative to one another. The friction generating device has a friction disc which bears against the adjacent end face of the outer section and is in direct contact with an undulate or dished spring which reacts against a retainer bearing against the respective stop of the inner section. The friction disc and the retainer have internal teeth mating with the external teeth of the inner section.

12 Claims, 3 Drawing Figures

CLUTCH PLATE WITH A COMPOSITE TORSION DAMPING HUB

BACKGROUND OF THE INVENTION

The present invention relates to clutch plates in general, and more particularly to improvements in clutch plates which can be used with advantage in friction clutches of automotive vehicles. Still more particularly, the invention relates to improvements in clutch plates of the type wherein the hub comprises two coaxial sections and wherein the inner section has an annulus of axially parallel external teeth mating, with at least some angular play, with the internal teeth of the outer section.

It is already known to provide a clutch plate with a composite hub whose sections are turnable within limits relative to each other as a result of a certain amount of play between the internal teeth of the outer section and the external teeth of the inner section. The two sections are held against axial movement relative to each other and a friction generating device is interposed between the two sections to yieldably oppose the angular movement of the outer section relative to the inner section and/or vice versa. Reference may be had, for example, to commonly owned U.S. Pat. No. 3,556,273 granted Jan. 19, 1971 to Paul Maucher for "Clutch disc with vibration dampers in series". The friction generating means between the inner and outer sections of the clutch plate which is disclosed in this patent comprises tubular bearing-like resilient elements which oppose rotation of the sections relative to one another. A ring-shaped spring is provided to hold the two sections against axial movement relative to each other. The magnitude of the resistance which the tubular resilient elements offer to relative rotation of the two sections about their common axis depends on the nature of the material of such resilient elements, and the resistance which the resilient elements offer to rotation of the one section relative to the other section and/or vice versa is likely to change with time. This can adversely influence the transmission of torque between the part or parts which drive the patented clutch plate and the part or parts which are driven by such clutch plate.

OBJECTS AND SUMMARY OF THE INVENTION

An object of the invention is to provide a novel and improved clutch plate wherein the resistance which is offered to relative angular movement between the two sections of the hub remains unchanged for extended periods of time and wherein such resistance can be selected with a high degree of accuracy.

Another object of the invention is to provide a relatively simple and inexpensive clutch plate which exhibits the above outlined features and which can be installed in existing friction clutches as a superior substitute for presently known clutch plates.

A further object of the invention is to provide a friction clutch which embodies the improved clutch plate.

An additional object of the invention is to provide the clutch plate with a novel and improved friction generating device which opposes the angular movements of the outer hub section with reference to the inner hub section and/or vice versa with a predictable force and for extended periods of time.

Another object of the invention is to provide a friction generating device which can perform at least one additional function, particularly the function of participating in opposition to axial movement of the two hub sections with reference to each other.

An additional object of the invention is to provide novel and improved connections between at least some components of the above outlined friction generating device and the inner and/or outer section of the hub.

A further object of the invention is to provide a novel and improved method of selecting the force with which the friction generating device opposes angular movements of the hub sections relative to each other.

Still another object of the invention is to provide a novel and improved inner hub section for use in a clutch plate of the above outlined character.

The invention is embodied in a clutch plate, particularly for use in friction clutches of automotive vehicles to transmit torque between the flywheel of an internal combustion engine and the input element of a variable-speed transmission. The clutch plate comprises a composite hub including coaxial inner and outer cylindrical or sleeve-like sections respectively having annuli of external and internal teeth which mate with limited freedom of angular movement of the two sections relative to one another, and means for holding the two sections of the hub against axial movement with reference to one another including first and second stops which are provided on the inner section and flank the outer section (i.e., the outer section is disposed between the first and second stops). The stops have first surfaces and the outer section has second surfaces which are adjacent to the respective stops. The clutch plate further comprises friction generating means which yieldably opposes angular movements of the two sections with reference to one another and such friction generating means comprises a friction disc which is interposed between the first stop and the outer section and has at least one tooth meshing with the neighboring external teeth of the inner section. The friction generating means further comprises resilient means (e.g., an undulate washer-like spring or a diaphragm spring) which bears directly against the friction disc and reacts against one of the respective first and second surfaces to urge the friction disc toward the other of the respective first and second surfaces. The extent of angular movement between the one tooth of the friction disc and the neighboring external teeth can be zero; at any rate, such angular movement is preferably less than the extent of angular movability of the two hub sections relative to one another. The friction disc can be formed with a plurality of teeth whose number matches that of the external teeth on the inner section.

The holding means preferably comprises two annular retainers at least one of which can be provided with at least one tooth which meshes with the neighboring external teeth of the inner section. As a rule, or in accordance with a presently preferred embodiment of the invention, each of the two retainers can be provided with a plurality of teeth, one for each external tooth of the inner section. Such retainers can constitute or include washers with annuli of internal teeth mating with the external teeth of the inner section at the respective axial ends of the outer section.

One of the retainers is interposed between the resilient means and the one surface of the respective first and second surfaces. In addition, such clutch plate can comprise a second friction disc which is interposed between the second stop and the outer section and the second retainer is then interposed between the second friction disc and one of the respective first and second surfaces.

The stops can include portions which are integral with the inner section of the hub, and such portions of the stops can be provided with shoulders which constitute the respective first surfaces. The inner section of the hub can be provided with an integral third stop which is inwardly adjacent to the first stop and is surrounded by the resilient means. The first retainer is axially fixed between the shoulders of the first and third stops, and the shoulder of the third stop preferably faces in the same direction as the shoulder of the second stop. The first, second and/or third stop can constitute a deformed portion of the inner section.

The novel features which are considered as characteristic of the invention are set forth in particular in the appended claims. The improved clutch plate itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
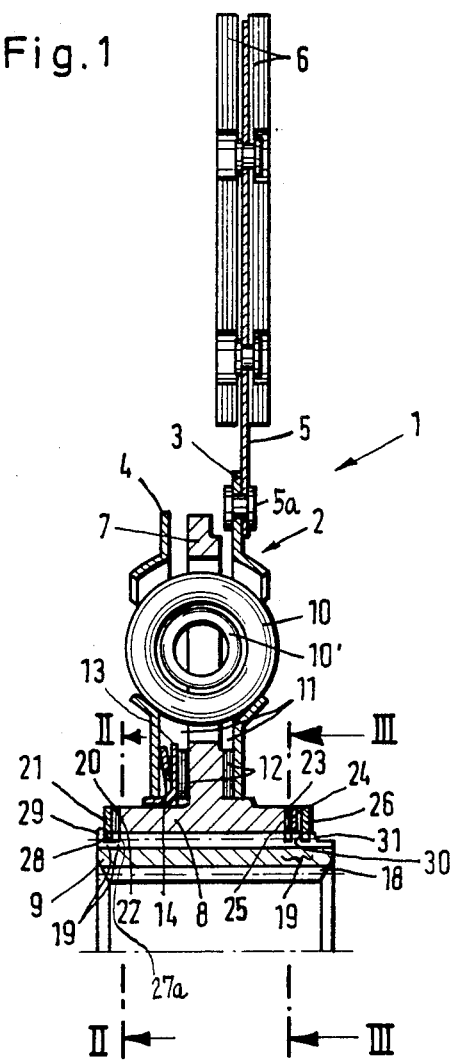
FIG. 1 is a fragmentary axial sectional view of a clutch plate which embodies one form of the present invention.

FIG. 1 shows a clutch plate 1 which includes a carrier assembly 2 for friction linings 6. The assembly 2 includes a disc 3 for one or more supports 5 which mount the linings 6. The disc 3 is coaxial with a similar second disc 4 which is axially spaced therefrom and is non-rotatably coupled therewith by suitable distancing means in a manner well known from the art and not forming part of the present invention. The support or supports 5 are secured to the disc 3 by an annulus of rivets 5a.

The discs 3 and 4 of the carrier assembly 2 are disposed at the opposite sides of a flange 7 which is rigidly connected to or integral with the cylindrical outer section 8 of a composite hub. The latter further comprises a cylindrical inner section 9 which is surrounded by the outer section 8 and whose end portions extend axially beyond the respective end portions of the section 8. The carrier assembly 2 has limited freedom of angular movement with reference to the flange 7 of the outer section 8. To this end, the flange 7 and the discs 3 and 4 are provided with windows for portions of energy storing means in the form of annuli of coil springs 10 and 10' (only one spring 10 and only one spring 10' shown in FIG. 1).

The clutch plate 1 of FIG. 1 further comprises a friction generating unit 11 which operates between the flange 7 and at least one of the discs 3, 4 to yieldably oppose angular movements of these discs with reference to the flange. The illustrated friction generating unit 11 comprises two friction discs 12 which are disposed at the opposite sides of the flange 7 (i.e., each of these friction discs is disposed between the flange 7 and one of the discs 3, 4). A biasing means in the form of a diaphragm spring 14 or the like is interposed between the disc 4 and the left-hand friction disc 12, and a washer 13 is preferably placed between the spring 14 and the just mentioned left-hand friction disc 12. The spring 14 biases the washer 13 axially against the left-hand friction disc 12 which bears against the flange 7 and urges the latter against the right-hand friction disc 12 which, in turn, bears against the right-hand disc 3 of the carrier assembly 2. The diaphragm spring 14 reacts against the left-hand disc 4 of the carrier assembly 2. As can be seen in FIG. 1, the radially innermost portion of the washer 13 is anchored in the left-hand disc 4 of the carrier assembly 2.

Figure 2:
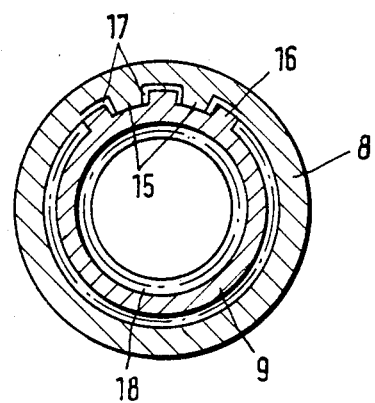
FIG. 2 is a sectional view as seen in the direction of arrows from the line II—II of FIG. 1.

FIG. 2 shows that the outer section 8 of the hub has an annulus of internal teeth 15 which mate with the external teeth 16 of the inner section 9. These teeth mate with a certain amount of play (indicated at 17) so that the section 8 has a limited freedom of angular movement with reference to the section 9 and/or vice versa. The inner section 9 of the hub is further formed with an annulus of internal teeth 18 which mate with the external teeth of the input element of a variable-speed transmission (not shown) so that the input element can be rotated by the clutch plate 1 when the friction linings 6 are clamped between two pressure plates one of which normally constitutes the flywheel on the crankshaft of an internal combustion engine if the illustrated clutch plate forms part of a friction clutch for automotive vehicles.

Referring again to FIG. 1, a two-part friction generating device 19 is installed between the sections 8 and 9 of the hub to yieldably oppose angular movements of these sections with reference to one another. Moreover, the friction generating device 19 contributes to proper positioning of the section 8 relative to the section 9 and/or vice versa, as considered in the axial direction of these sections. This friction generating device comprises a left-hand friction disc 20 which is disposed between a disc-shaped annular back support or retainer 21 and the adjacent surface or end face 22 of the outer section 8. The retainer 21 abuts against a surface or shoulder which is provided on a ring-shaped stop 29 of the inner section 9 and faces in a direction to the right, as viewed in FIG. 1.

The friction generating device 19 further comprises a second friction disc 23 which is disposed between the right-hand end face or surface 25 of the outer section 8 and a shoulder on a stop 30 of the inner section 9. The shoulder of the stop 30 faces in a direction to the right, as viewed in FIG. 1. The friction disc 23 is biased toward the surface 25 by resilient means here shown as an undulate annular spring 24 which surrounds the stop 30 and bears directly against the disc 23; this spring reacts against a washer-like retainer or back support 26 which is fixed to the section 9 and abuts against the shoulder of the stop 30. The undulate spring 24 is installed in prestressed condition so that it urges the friction disc 23 against the surface 25 of the section 8 whereby the surface 22 bears against the friction disc 20 which urges the retainer 21 against the shoulder of the stop 29.

Figure 3:
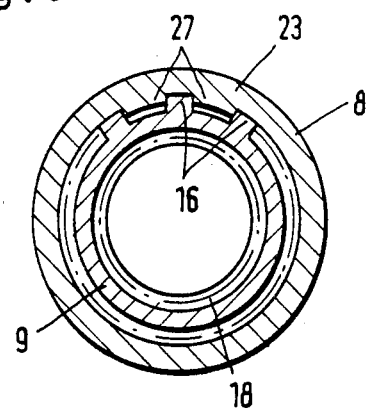
FIG. 3 is a sectional view as seen in the direction of arrows from the line III—III of FIG. 1.

FIG. 3 shows that the friction disc 23 is formed with an annulus of internal teeth 27 which mate with the external teeth 16 of the outer section 8 without any angular play or with a play which is substantially less than the play 17 shown in FIG. 2. Thus, the friction disc 23 cannot turn relative to the section 9 and/or vice versa. Consequently, if the outer section 8 is caused to turn with reference to the inner section 9 and/or vice versa, such angular movement can take place only by overcoming the friction between the disc 23 and the surface 25 of the section 8. The friction disc 23 cannot turn with reference to the undulate spring 24 and/or vice versa because the disc 23 cannot rotate with reference to the section 9 and the spring 24 is disposed between the friction disc 23 and the retainer 26 which latter abuts against the shoulder of the stop 30 and cannot rotate with reference to the section 9.

The friction disc 20 is also provided with one or more internal teeth 27a which correspond to the internal teeth 27 of the friction disc 23 and mate with the neighboring external teeth 16 of the section 9 to hold the friction disc 20 and the section 9 against angular movement with reference to one another. It is preferable to use two identical friction discs one of which constitutes the part 20 and the other of which constitutes the part 23.

The retainer 21 for the friction disc 20 is formed with one or more internal teeth 28 which mate with the external teeth 16 of the inner section 9. Thus, the retainer 21 is held against angular movement with reference to the section 9, and this retainer is also held against axial movement relative to the section 9 because it is biased by the undulate spring 24 so that it bears against the shoulder of the stop 29.

In order to ensure that the undulate spring 24 will be subjected to a predetermined initial stress, the retainer 26 is caused to bear against the right-hand surface or shoulder of the stop 30 by upsetting a portion of the inner section 9 at the right-hand side of the retainer 26 after the parts which are shown in FIG. 1 are properly assembled, i.e., after the carrier assembly 2 is properly mounted on the outer section 8 and the latter is properly mounted on the inner section 9 together with the component parts of the friction generating device 19. The distance between the shoulders of the stops 29 and 30 is selected in such a way that the spring 24 is subjected to a predetermined optimum initial stress when the retainer 26 abuts against the stop 30. Once the retainer 26 is permanently locked against axial movement with reference to the section 9 by resorting to a suitable material deforming technique to form a further stop at the right-hand side of the retainer 26 (i.e., to the right of the stop 30), the shoulder of the stop 30 permanently abuts against the adjacent retainer 26 and thus confines the spring 24 between the retainer 26 and the friction disc 23. The latter bears against the adjacent surface 25 of the section 8 and urges the surface 22 against the friction disc 20 which bears against the retainer 21 and urges the latter against the shoulder of the stop 29. The locus where the upsetting of the material of the inner section 9 takes place to form the further stop is indicated at 31. To this end, the upsetting tool moves axially extending portions of the material of the inner section 9 toward the retainer 26. The stop 30 for the retainer 26 is actually formed by reducing the height of corresponding portions of external teeth 16 on the section 9. The retainer 26 is further provided with one or more internal teeth (not specifically shown) which correspond to the teeth 28 of the other retainer 21 and mate with the shortened portions of teeth 16 on the section 9 so that the retainer 26 cannot turn relative to the section 9 even if one would attempt to effect a relative angular movement between the parts 9 and 26.

It is clear that the improved clutch plate is susceptible of numerous modifications without departing from the spirit of the invention. For example, the undulate washer-like spring 24 can be replaced with a diaphragm spring, such as the diaphragm spring 14, or the illustrated single spring 24 can be replaced by a set of several springs. Moreover, the number of internal teeth on the friction discs 20, 23 and retainers 21, 26 need not equal the number of external teeth 16 on the section 9. For example, a single internal tooth of the part 20, 21, 23 and/or 26 will suffice to ensure proper engagement with neighboring external teeth 16 and to thus prevent any or any noticeable angular displacement of the part 20, 21, 23 and/or 26 with reference to the inner section 9 and/or vice versa.

The parts 29, 31, 21 and 26 together constitute a means for holding the sections 8 and 9 against axial movement relative to one another. The shoulder of the part or stop 31 is a stop surface for the right-hand side of the retainer 26, and the shoulder of the stop 30 is a stop surface for the left-hand side of the retainer 26.

An important advantage of the improved friction generating device 19 is that it invariably ensures frictional engagement between the same set or sets of surfaces, namely, between at least one end face or surface 22 or 25 of the outer section 8 and the adjacent surface of the corresponding friction disc 20 or 23. This is due to the fact that the friction discs 20 and 23 are held against angular movement with reference to the inner section 8 of the composite hub and also that such friction discs invariably remain adjacent to and in contact with the respective end faces or surfaces 22, 25 of the section 8. The friction discs 20 and 23 can turn with reference to the section 8 but cannot turn with reference to the section 9 and/or with reference to the parts (21 and 24) which are immediately adjacent thereto. As already mentioned above, the retainer 21 which is immediately adjacent to the friction disc 20 cannot rotate relative to the inner section 9 because its tooth or teeth 28 mate with the neighboring teeth 16 of the section 9, and the spring 24 cannot rotate with reference to the friction disc 23 because it is held between this friction disc and the retainer 26 which latter is held against rotation and also against axial movement with reference to the hub section 9.

Since the spring 24 is held against rotation with reference to the neighboring parts 23, 26 and 9 and/or vice versa, it cannot penetrate into and thereby damage such parts or vice versa. Moreover, this renders it possible to dispense with a washer between the spring 24 and the friction disc 23 since the fact that the spring 24 bears directly against the friction disc 23 does not adversely influence the useful life, the configuration and/or the function of the part 23 and/or 24. In addition, omission of a customary washer contributes to lower cost of the clutch plate, not only because of a reduction of the overall number of parts but also because the cost of assembling the clutch plate is reduced accordingly. Of course, the feature that the spring 24 cannot turn with reference to the neighboring friction disc 23 and/or vice versa also enhances the useful life of these parts and reduces the likelihood that the bias of the spring 24 upon the friction disc 23 would change within a relatively short interval of time. In fact, the bias of the spring 24 can remain satisfactory during the entire service life of the clutch plate, i.e, the force with which the friction disc 23 opposes rotation of the section 9 with reference to the section 8 and/or vice versa remains at least substantially unchanged during the entire useful life of the clutch plate.

As mentioned above, the number of internal teeth on the parts 20, 21, 23 and 26 need not match the number of external teeth 16 on the section 8. However, at least in many instances, the number of internal teeth on the friction discs 20, 23 and retainers 21, 26 preferably matches the number of teeth 16; this reduces the wear upon individual teeth of the mating parts and ensures more predictable transfer of friction moments.

The friction disc 20 constitutes an optional but highly advantageous feature of the improved friction generating device 19. If desired, the retainer 21 can also be fixed in a selected axial position with reference to the section 8 of the composite hub. The exact nature of the form-locking connection between the retainer 21 and/or 26 and the section 8 can be selected practically at will; all that counts is to ensure that these retainers are properly held against axial movement away from one another to thus ensure that the bias of the spring 24 cannot change while the clutch plate 1 is in use. It is further possible to axially movably install the retainer 26 adjacent to the shoulder of the stop 31 and to mount the retainer 21 in an axially fixed position in which the spring 24 is subjected to a requisite initial stress.

The provision of integral stops 29–31 on the inner section 8 of the hub constitutes a very simple and reliable expedient of properly locating the retainers 21 and 26 of the friction generating device 19 in requisite axial positions. It is further desirable and advantageous if the shoulders of the two stops 29 and 30 face in the same direction, as considered axially of the inner section 8. This ensures that both retainers (21 and 26) can be installed by slipping them over the right-hand axial end of the section 8, as viewed in FIG. 1. Once the parts are assembled in a manner as shown in the drawing, the retainer 26 is fixed against axial movement in a direction away from the retainer 21 by upsetting the section 9 at 31. It will be noted that the locus (stop 31) of upsetting is adjacent to that retainer (26) which is last to be mounted on the inner section 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in the friction clutch of an automotive vehicle, comprising a hub including coaxial inner and outer sections respectively having external and internal teeth which mate with limited freedom of angular movement of said sections relative to one another; means for holding said sections against axial movement with reference to one another, including first and second stops provided on said inner section and flanking said outer section, each of said stops having a first surface and said outer section having second surfaces adjacent to the respective stops, said holding means further including an annular retainer having at least one tooth meshing with the neighboring external teeth of said inner section, said retainer abutting against one of said first and second surfaces; and friction generating means for yieldably opposing angular movements of said sections with reference to one another, including a first friction disc interposed between said first stop and said outer section and having at least one tooth meshing with the neighboring external teeth of said inner section, and resilient means bearing directly against said friction disc and reacting against said retainer to urge said friction disc toward the other of the respective first and second surfaces, said friction generating means further including a second friction disc interposed between said second stop and said outer section.

2. The clutch plate of claim 1, wherein the extent of angular movement between said one tooth of said friction disc and the neighboring external teeth of said inner section is less than the extent of angular movement between the teeth of said sections.

3. The clutch plate of claim 1, wherein said friction disc has a plurality of teeth whose number matches the number of external teeth on said inner section.

4. The clutch plate of claim 1, wherein said resilient means includes an undulate washer.

5. The clutch plate of claim 1, wherein said resilient means includes a diaphragm spring.

6. The clutch plate of claim 1, wherein said holding means comprises two annular retainers each having at least one tooth meshing with the neighboring external teeth of said inner section.

7. The clutch plate of claim 1, wherein said holding means comprises two annular retainers and at least one of said retainers has at least one tooth mating with the neighboring external teeth of said inner section.

8. The clutch plate of claim 7, wherein each of said retainers has a plurality of teeth, the number of teeth on each of said retainers matching the number of external teeth on said inner section.

9. The clutch plate of claim 1, wherein said holding means further comprises a second retainer interposed between said second friction disc and one of the respective first and second surfaces.

10. The clutch plate of claim 1, wherein said stops are integral with said inner section and have shoulders constituting the respective first surfaces.

11. The clutch plate of claim 10, further comprising a third stop surrounded by said resilient means and having a shoulder facing in the same direction as the shoulder of said second stop, said holding means further comprising an annular retainer adjacent to said resilient means and axially fixed between said first and third stops.

12. The clutch plate of claim 1, wherein said first stop constitutes a deformed portion of said inner section.

* * * * *